US010691760B2

(12) United States Patent
Pattabiraman et al.

(10) Patent No.: US 10,691,760 B2
(45) Date of Patent: Jun. 23, 2020

(54) GUIDED SEARCH

(71) Applicant: Microsoft Technology Licensing, LLC, Redmond, WA (US)

(72) Inventors: Kumaresh Pattabiraman, Sunnyvale, CA (US); Nihit Desai, Mountain View, CA (US); Daniel Tunkelang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 14/582,065

(22) Filed: Dec. 23, 2014

(65) Prior Publication Data
US 2016/0132602 A1   May 12, 2016

Related U.S. Application Data
(60) Provisional application No. 62/076,441, filed on Nov. 6, 2014.

(51) Int. Cl.
| | | |
|---|---|---|
| *G06F 16/00* | (2019.01) | |
| *G06F 16/9535* | (2019.01) | |
| *G06Q 50/00* | (2012.01) | |
| *G06F 16/2457* | (2019.01) | |
| *G06F 16/9032* | (2019.01) | |
| *G06F 16/9532* | (2019.01) | |

(52) U.S. Cl.
CPC .... *G06F 16/9535* (2019.01); *G06F 16/24578* (2019.01); *G06F 16/90328* (2019.01); *G06F 16/9532* (2019.01); *G06Q 50/01* (2013.01)

(58) Field of Classification Search
CPC ................................................. G06F 16/9535
See application file for complete search history.

(56) References Cited

U.S. PATENT DOCUMENTS

| | | | |
|---|---|---|---|
| 7,574,436 B2* | 8/2009 | Kapur | G06F 16/30 |
| 2006/0026147 A1* | 2/2006 | Cone | G06F 17/30867 |
| 2008/0189264 A1* | 8/2008 | Cochran | G06F 17/30864 |
| 2009/0198675 A1* | 8/2009 | Mihalik | G06F 17/30864 |
| 2010/0228710 A1* | 9/2010 | Imig | G06F 17/30867 |
| | | | 707/706 |
| 2010/0318551 A1* | 12/2010 | Lai | G06F 17/30699 |
| | | | 707/765 |
| 2011/0060752 A1* | 3/2011 | Lane | G06F 17/3064 |
| | | | 707/766 |

(Continued)

*Primary Examiner* — Grace Park
(74) *Attorney, Agent, or Firm* — Schwegman Lundberg & Woessner, P.A.

(57) ABSTRACT

Techniques for assisting a user in conducting a search for online content are described. According to various embodiments, a set of search results is generated, in response to a user search query. A list of candidate facet-value pairs, for inclusion in a suggestion facet user interface element for display in-line with the set of search results, is then accessed. The suggestion facet user interface element may be configured, upon user selection, to filter the set of search results based on the corresponding facet-value pair. Thereafter, win rate information identifying win rates associated with each of the candidate facet-value pairs is accessed. A specific one of the candidate facet-value pairs having the highest win rate is then selected for inclusion in the suggestion facet user interface element.

17 Claims, 9 Drawing Sheets

(56) References Cited

U.S. PATENT DOCUMENTS

| | | | |
|---|---|---|---|
| 2012/0030152 A1* | 2/2012 | Pueyo | G06F 17/30867 706/12 |
| 2013/0036109 A1* | 2/2013 | Kulick | G06Q 10/10 707/722 |
| 2013/0226916 A1* | 8/2013 | Dredze | G06F 17/3064 707/727 |
| 2014/0172821 A1* | 6/2014 | Hu | G06F 17/30867 707/711 |
| 2016/0026643 A1* | 1/2016 | Desai | G06Q 10/10 707/727 |

* cited by examiner

GUIDED SEARCH

CROSS-REFERENCE TO RELATED APPLICATIONS

This application claims the priority benefit of U.S. Provisional Application No. 62/076,441, filed on Nov. 6, 2014, which is incorporated herein by reference.

TECHNICAL FIELD

The present application relates generally to data processing systems and, in one specific example, to techniques for assisting a user in conducting a search for online content.

BACKGROUND

Online social network services such as LinkedIn® are becoming increasingly popular, with many such websites boasting millions of active members. Each member of the online social network service is able to upload an editable member profile page to the online social network service. Further, online social network services such as LinkedIn® include a search feature where, for example, a member may search for other member profile pages, company profile pages, jobs, etc., posted on the online social network service.

BRIEF DESCRIPTION OF THE DRAWINGS

Some embodiments are illustrated by way of example and not limitation in the figures of the accompanying drawings in which.

DETAILED DESCRIPTION

Example methods and systems for assisting a user in conducting a search for online content are described. In the following description, for purposes of explanation, numerous specific details are set forth in order to provide a thorough understanding of example embodiments. It will be evident, however, to one skilled in the art that the embodiments of the present disclosure may be practiced without these specific details.

Figure 1:
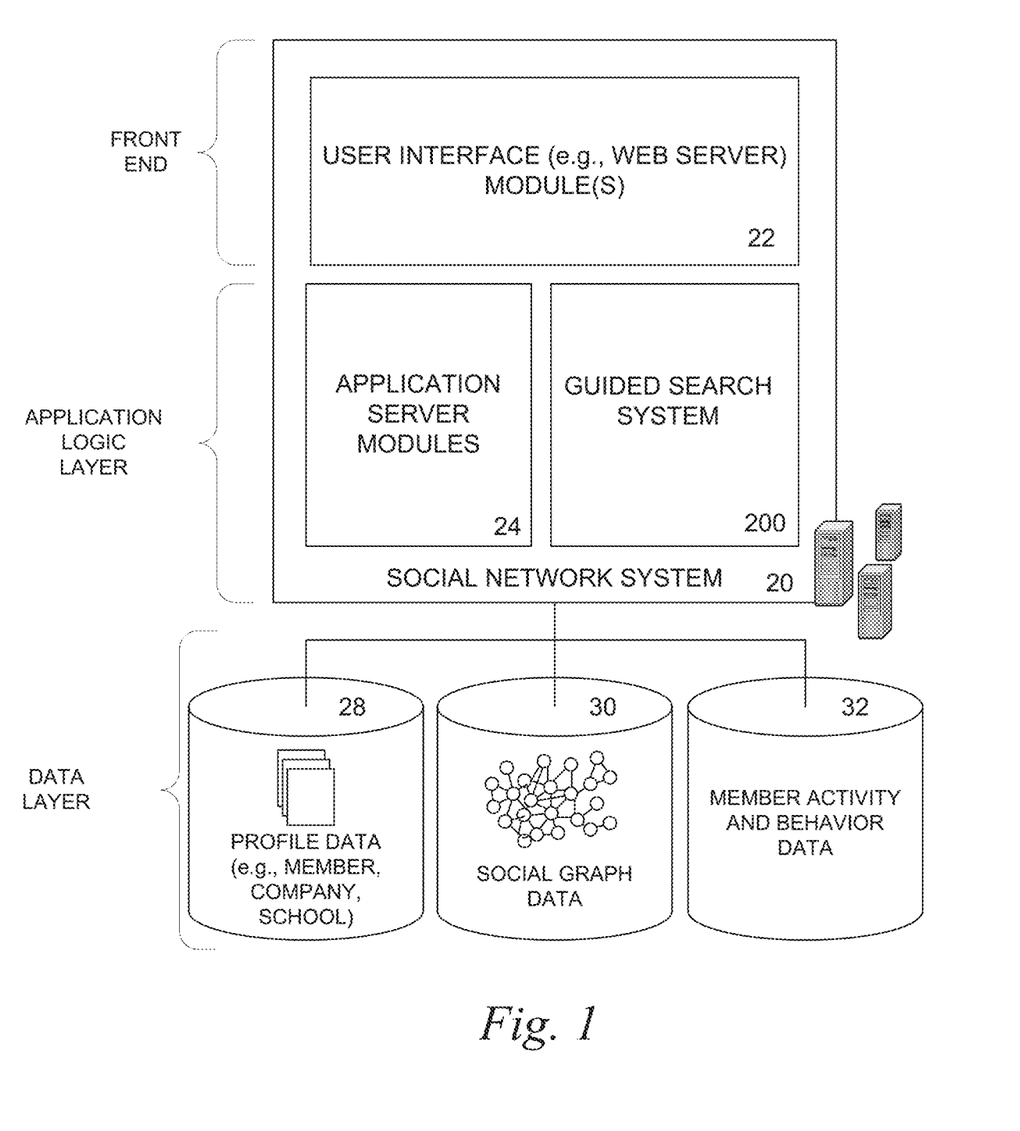
FIG. 1 is a block diagram showing the functional components of a social networking service, consistent with some embodiments of the present disclosure.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data, for example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a guided search system 200. The guided search system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
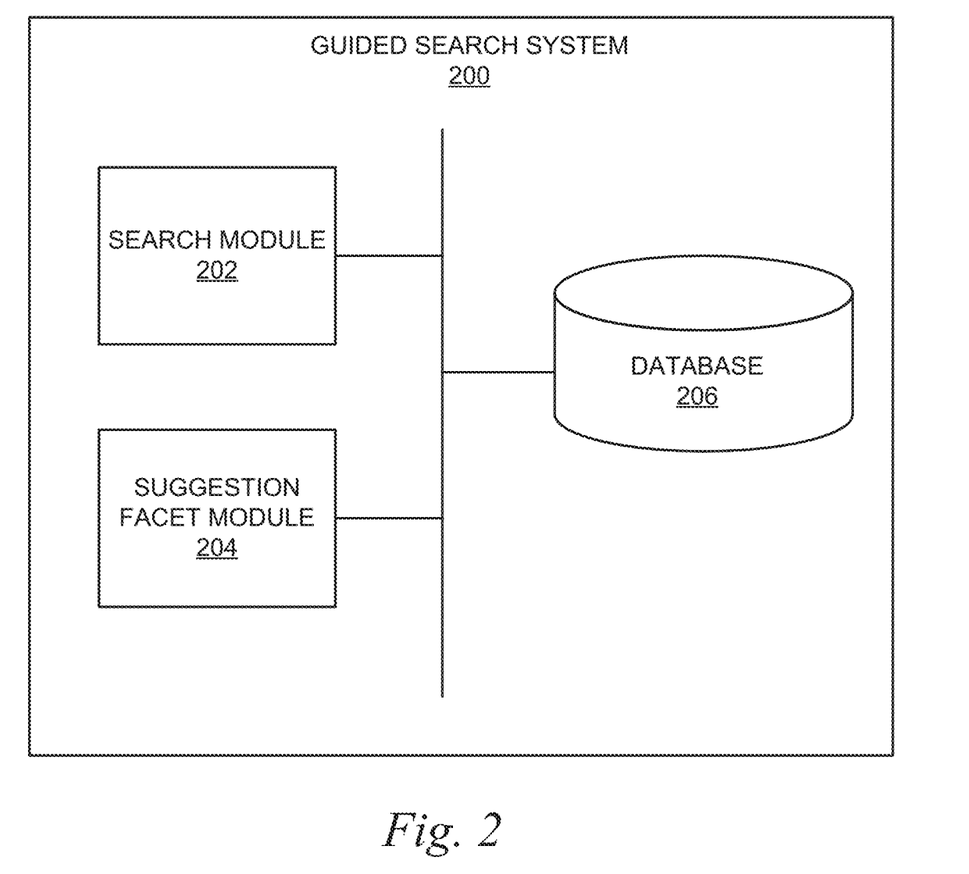
FIG. 2 is a block diagram of an example system, according to various embodiments.

Turning now to FIG. 2, a guided search system 200 includes a search module 202, a suggestion facet module 204, and a database 206. The modules of the guided search system 200 may be implemented on or executed by a single device such as a guided search device, or on separate devices interconnected via a network. The aforementioned guided search device may be, for example, one or more client machines or application servers. The operation of each of the aforementioned modules of the guided search system 200 will be described in greater detail herein in conjunction with the various figures.

According to various example embodiments, the guided search system 200 is configured to aid a user in conducting searches, such as searches for job postings on an online social network service such as LinkedIn. For example, the LinkedIn online social network service includes a search query user interface, whereby a user can enter search terms such as "software engineer" in order to view search results of job postings matching the search query terms. Since the LinkedIn online social network service has millions of job postings, a significant number of results may be returned for a given job query search.

In some embodiments, the guided search system 200 filters a large result set to display results that are most likely to matter to a job searcher on a personalized basis. For example, suppose a job searcher searches for "software engineer", and the result set includes 10,000 results for that query. Accordingly, the guided search system 200 may suggest to the searcher that the result list should be filtered to include only jobs in San Francisco, or jobs in the software industry, or jobs posted in the last week, or jobs having a specific salary range, or jobs having a particular seniority level (e.g., director level jobs), etc.

Figure 3:
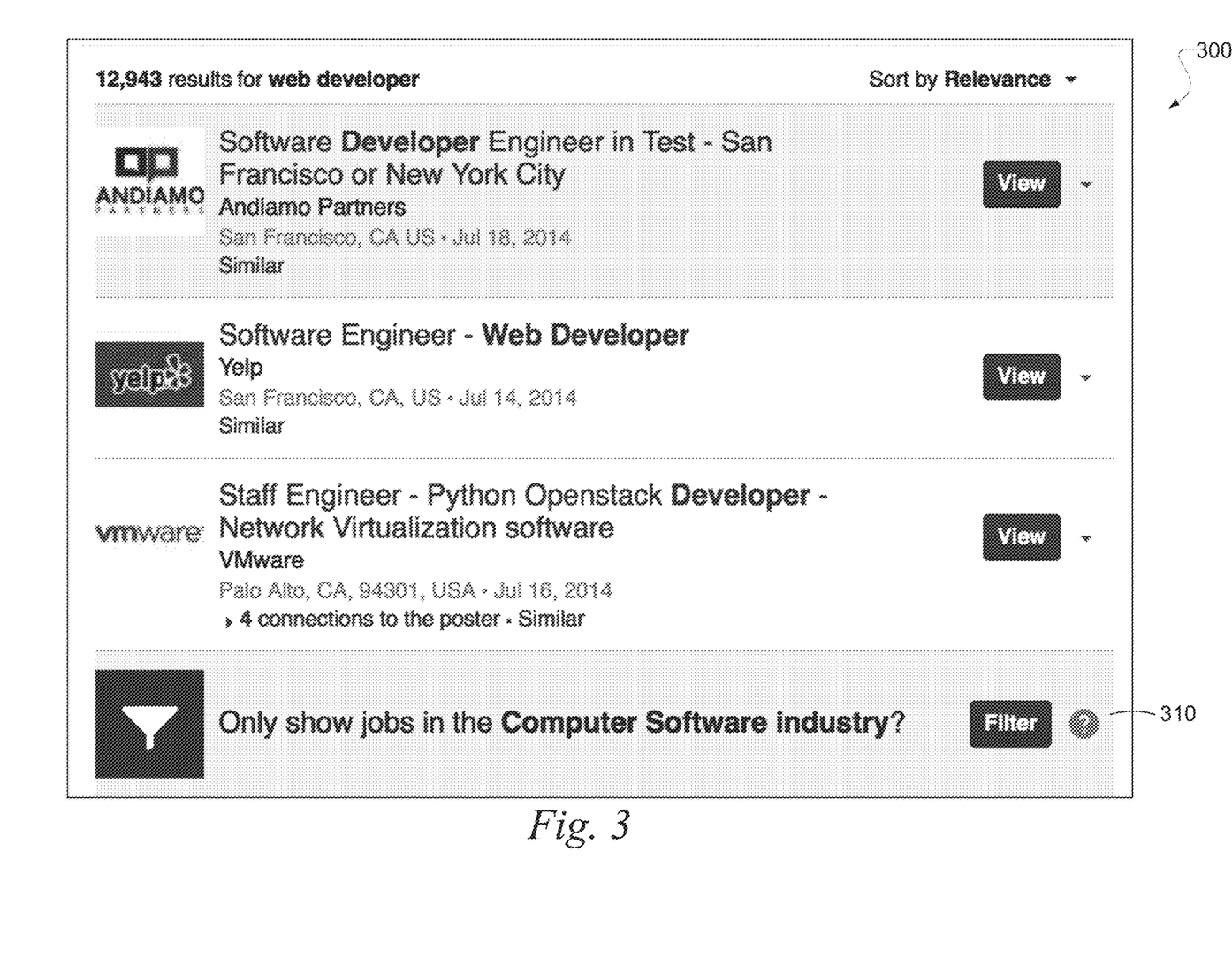
FIG. 3 illustrates an example portion of a user interface, according to various embodiments.
Figure 4:
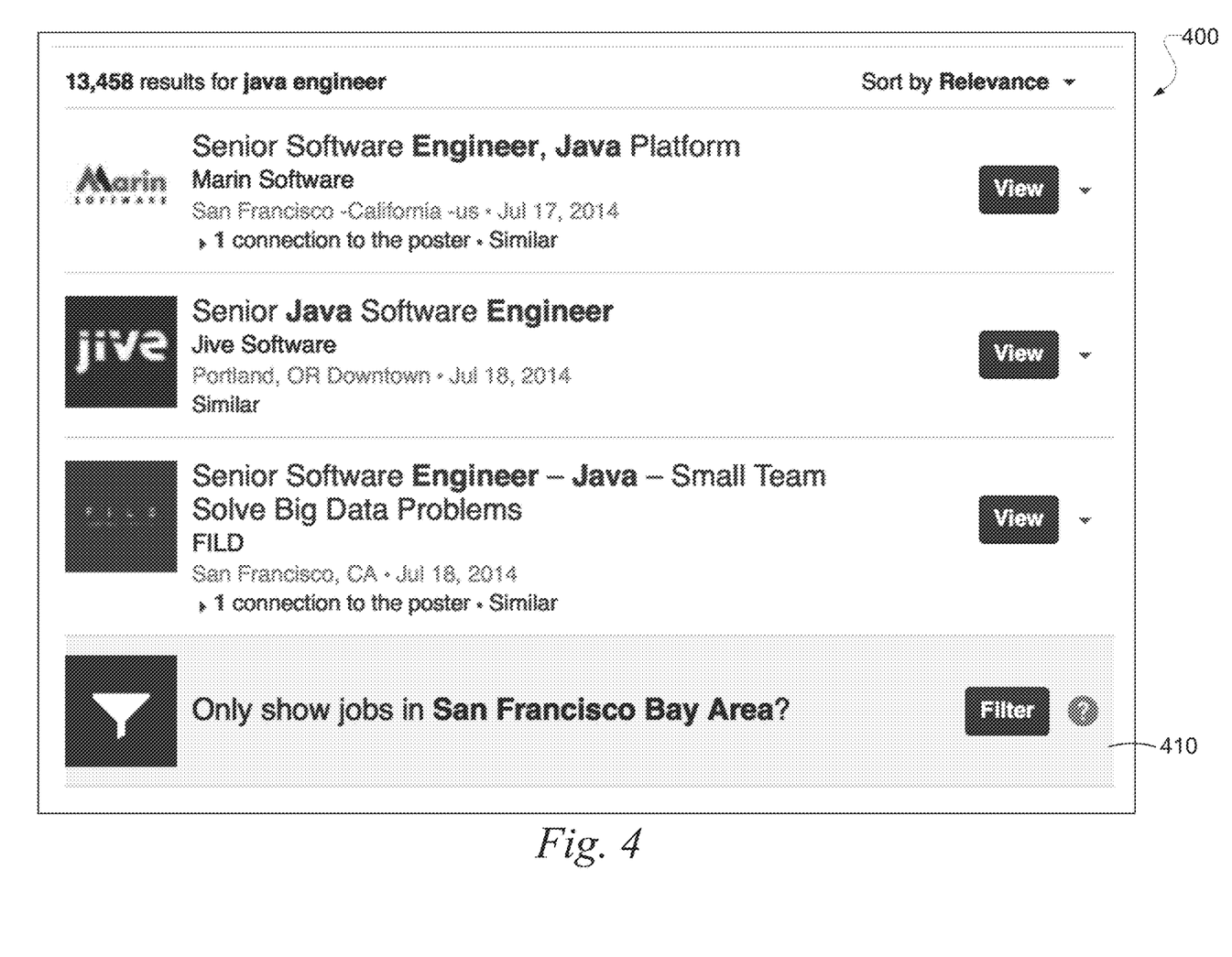
FIG. 4 illustrates an example portion of a user interface, according to various embodiments.

In some embodiments, the guided search system 200 may provide such suggestions via a suggestion facet user interface (or a suggestion facet user interface element) in line with the search results. For example, see suggestion facet user interface 210 in the list of results 200 in FIG. 2, and suggestion facet user interface 310 in the list of results 300 in FIG. 3. As used herein, a suggestion facet user interface presents a user with a set of one or more filters (also termed facets). For example, with respect to searches that have been identified as related to jobs posted in an online network system, facets that may be used to refine search results may include a "company" facet, a "location" facet, etc. A facet may have a variable value. For example, the facet "location" may take specific values corresponding to specific locations, such as, e.g., "San Francisco Bay Area," "Greater Boston," etc. Accordingly, the suggestion facet user interface described herein will display a suggestion or suggested facet-value pair, such as industry=computer software (see FIG. 2) or location=San Francisco Bay Area (see FIG. 3). If the user clicks on the suggestion facet user interface, it will filter all the search results (above and below the suggestion facet user interface) based on the selected facet-value pair, in order to produce a more focused set of results.

In some embodiments, the suggestion facet user interface may be displayed in-line in a predetermined position in the search results such that it appears to be one of the search results, (e.g., the fourth search result). This may be advantageous because the suggestion facet user interface may be something a member notices after they have seen the top few results. Thus, if they already find relevant results, they can simply select them without referring to the suggestion facet user interface. At the same time, the suggestion facet user interface is not low enough that the user will not notice it.

In some embodiments the guided search system 200 may utilize various factors to determine what suggestions are to be included in the suggestion facet user interfaces. Such factors include:

1) Popularity, which indicates which facet-value pairs (e.g. industry=computer software (see FIG. 2) or location=San Francisco Bay Area (see FIG. 3)) are the most commonly used. For example, the guided search system 200 may infer this offline based on logs of how searchers interact with search results performed over time. Thus, given a set of candidate suggestions (or facet-value pairs) that may each be provided to a searcher (e.g., via a suggestion facet user interface), the guided search system 200 may assign a popularity score to each of the candidate suggestions, the popularity score indicating the popularity of each of the suggestions (e.g., as measure by raw number of clicks of the facet-value pairs, or a click through rate (CTR) of those facet-value pairs). The guided search system 200 may then rank each of the candidate suggestions, based on their popularity scores, and select the highest ranked candidate suggestion for insertion into a suggestion facet user interface.

2) Usefulness, which indicates if a searcher does apply a given filter, then how useful will that filter likely be to the searcher. In some embodiments, the guided search system 200 may categorize usefulness based on the extent a given filter would change a top page of results. For example, if the selection of a given filter (e.g., industry=computer software) would not change the current first page of results at all, then the guided search system 200 will infer that this fitter has low usefulness. Thus, given a set of candidate suggestions (or facet-value pairs) that may each be provided to a searcher (e.g., via a suggestion facet user interface), the guided search system 200 may assign an importance score to each of the candidate suggestions, the importance score indicating the importance of each of the suggestions. The guided search system 200 may then rank each of the candidate suggestions, based on their importance scores, and select the highest ranked candidate suggestion for insertion into a suggestion facet user interface.

3) Personalization based on member profile data. For example, the guided search system 200 may select facet-value pairs matching member profile attributes such as location, industry, seniority level, company size, job title, etc.

4) How much the result set size would change, if the searcher were to apply that facet. For example, suppose there are no available jobs in the San Francisco bay area. Thus, the guided search system 200 will not suggest location=San Francisco Bay Area as a facet-value pair, because the searcher is going to be provided with no results if they select it.

In some embodiments, the LinkedIn online social network service includes paid job listings (where users have paid to post such jobs on LinkedIn), as well as unpaid job listings which may be ingested from third party websites. Such third party websites often post large numbers of similar or identical jobs having similar or identical employers, locations, job functions, etc. This may lead to search result sets where such job listings, employers, locations, etc., are disproportionately overrepresented. Previously, the paid job postings tend to be highly relevant to a certain job searchers, and the suggested facet-value pairs were tailored to that quality set of results. However, with the inflow of unpaid job listings, the same suggestions may be less relevant and, in some cases, lead to bad experiences. For example, the popularity metric (described above) for measuring a raw number of clicks may be skewed based on the ingestion of a large quantity of similar or identical job listings.

Accordingly, in some embodiments, the guided search system 200 may tune the suggestions for inclusion in a suggestion facet user interface based on click through rates and/or win-rates. For example, the guided search system 200 may pick suggestion facet UI elements that have the highest win-rates. In some embodiments, a win-rate indicates how often suggestion is selected in terms of clicks relative to entities below it that it has displaced. For example, if a module or suggestion gets a 50% win rate, it means it received 50% of clicks that happened on this module and every entity below it, Thus, given a set of candidate suggestions (or facet-value pairs) that may each be provided to a searcher (e.g., via a suggestion facet user interface), the guided search system 200 may determine win rates for each of the candidate suggestions. The guided search system 200 may then rank each of the candidate suggestions, based on their click-through rates, and select the highest ranked candidate suggestion for insertion into a suggestion facet user interface.

Figure 5:
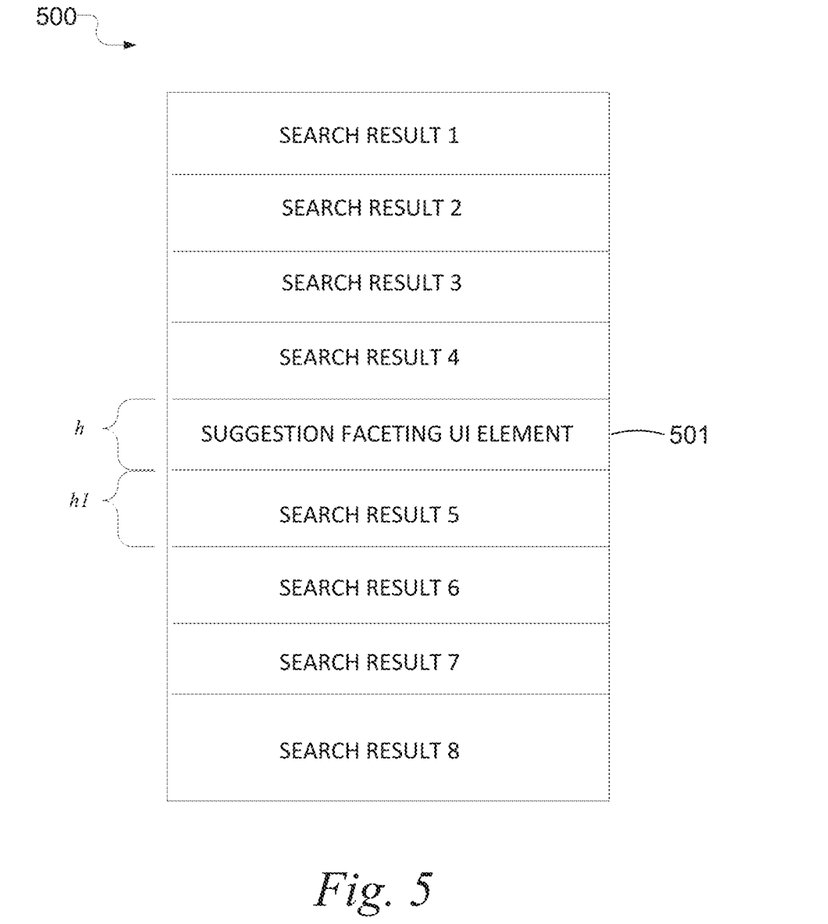
FIG. 5 illustrates an example portion of a user interface, according to various embodiments.

In some embodiments, the guided search system 200 may utilize win rates to determine what face-value pair to suggest to a user (e.g., via the suggestion facet UI elements described herein). As described herein, a win rate is defined as: no. of wins/(no. of wins+no. of losses). Generally, a win is defined as a user click on a suggested facet-value pair (e.g., a suggestion facet UI element 501 displayed in-line with search results 1-8 on a search results page 500, as illustrated in FIG. 5). A loss is defined as a user click on any of the search results display below the suggestion facet UI element 501 (e.g., search results 5-8 on the search results page 500).

The guided search system 200 is configured on the basis that the user clicks should be on the top of the search results page as much as possible, indicating that the user is finding what they are looking for as soon as possible. However, if the user clicked somewhere below the suggestion facet UI element 501 (e.g., search result 5 on the search results page 500), this indicates that the user is actually seeking search result 5, but the insertion by the guided search system 200 of the suggestion facet UI element 501 actually displaced what they were looking (search result 5) and pushed it down further. Thus, the guided search system 200 treats a user click somewhere below the suggestion facet UI element 501 as a loss.

In contrast, if the user clicks on a search result above the suggestion facet UI element 501 (e.g., search results 1-4), then this would not count as either a win or a loss, because the insertion of the suggestion facet UI element 501 by the guided search system 200 had no impact on the user's effort to find what they were looking for. For example, if the user clicks on search result 1 above the suggestion facet UI element 501, then the insertion of the suggestion facet UI element 501 below search result 1 it did not impact their effort to find what search result 1. Moreover, if the user doesn't click on anything in the search results page 500, then this would not count as either a win or a loss, because if the user did not click on anything, they would not have found what they were looking for in the entire page even with the insertion of the suggestion facet UI element 501.

In some embodiments, the guided search system 200 may utilize win rates to determine where to include a suggested facet-value pair in a set of search results. The guided search system 200 may make such a determination due to the fact that there is may be a cost to the user associated with the incorrect insertion of a suggestion facet UI element (e.g., the user now has to browse through a larger set of results). Thus, the guided search system 200 may receive a user specification (e.g., via a user interface displayed by the guided search system 200) of a target win rate. The guided search system 200 may then insert a given suggestion facet UI element in various places throughout the page (e.g., via a randomized experiment conducted over a predetermined time period) and determined the resulting win-rate. Generally, the lower a suggestion facet UI element is placed by the guided search system 200 in a set of search results, the higher the resulting win rate (since there are a smaller number of results below the suggestion facet UI element in the search page that may be considered as losses when clicked). Thus, if the guided search system 200 determines that the win rate when the given suggestion facet UI element is inserted at position X in the search results is too low, the guided search system 200 may insert the suggestion facet UI element at a position Y lower than position X.

In some embodiments, a size-adjusted win rate may be utilized by the guided search system 200 instead of the other win rates described herein. For example, with reference to FIG. 5, in the win rates described above, any clicks below the suggestion facet UI element 501 are counted as losses. Alternatively, in the list of 8 results illustrated in FIG. 5, a click on result 5 may be penalized more than a click on result 8 using the metric of size-adjusted win rates. This is because the difference to the user in terms of how much effort they must put in to click on result 8, due to the insertion of the suggestion facet user interface element 501, is less than the difference to the user in terms of how much effort they must put in to click on result 5 (e.g., because they must look 20% lower in the search results page since the search result moved from position 4 to position 5). Thus, in some embodiments, given the insertion of a suggestion facet UI element 501 of height h, only clicks on something in a portion of height h below the suggestion facet UI element 501 (e.g., see portion h1) are counted as a loss. Other sized portions different to height h below the suggestion facet UI element 501 may also be utilized for the purposes of determining losses. In alternative embodiments, only clicks on a predetermined number of search results below the suggestion facet UI element 501 are counted as a loss. For example, the aforementioned predetermined number of search results may be 1, such as in a case when height h may equal the height of one result.

Figure 6:
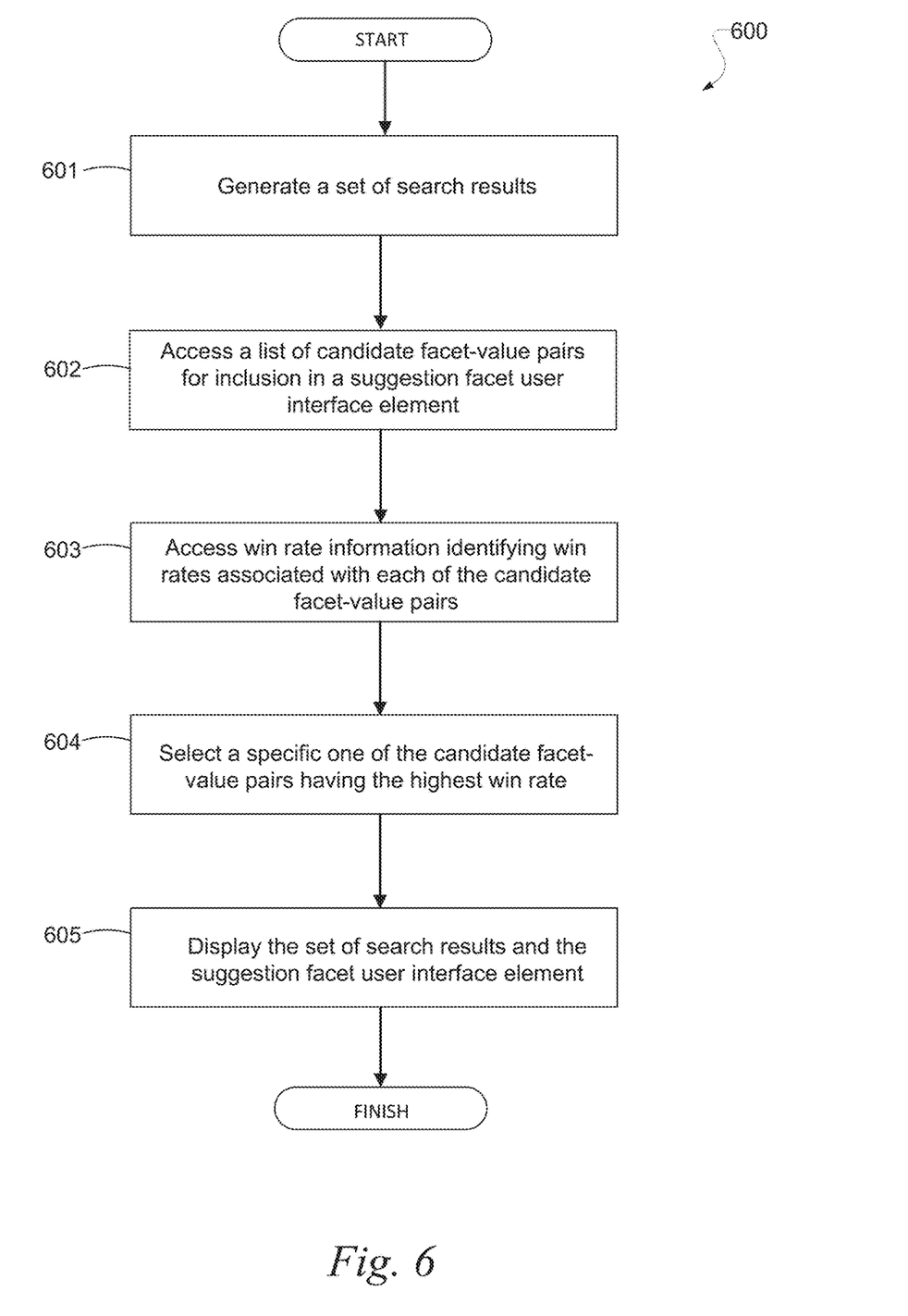
FIG. 6 is a flowchart illustrating an example method, according to various embodiments.

FIG. 6 is a flowchart illustrating an example method 600, consistent with various embodiments described herein. The method 600 may be performed at least in part by, for example, the guided search system 200 illustrated in FIG. 2 (or an apparatus having similar modules, such as one or more client machines or application servers). In operation 601, the search module 202 generates, in response to a user search query, a set of search results. In operation 602, the suggestion facet module 204 accesses a list of candidate facet-value pairs (e.g., stored in database 208) for inclusion in a suggestion facet user interface element for display in-line with the set of search results generated in operation 601. As described herein, the suggestion facet user interface element being configured in filter the set of search results based on the corresponding facet-value pair. In operation 603, the suggestion facet module 204 accesses win rate information (e.g., stored in database 208) identifying win rates associated with each of the candidate facet-value pairs accessed in operation 602. In operation 604, the suggestion facet module 204 selects a specific one of the candidate facet-value pairs having the highest win rate for inclusion in (or association with) the suggestion facet user interface element, based on the win rate information accessed in operation 603. The win rate information may be generated by the suggestion facet module 204, consistent with various embodiments described herein. In operation 605, the suggestion facet module 204 displays, via a user interface, a set of search results, and a suggestion facet user interface element in line with the set of search results. It is contemplated that the operations of method 600 may incorporate any of the other features disclosed herein. Various operations in the method 600 may be omitted or rearranged, as necessary.

Figure 7:
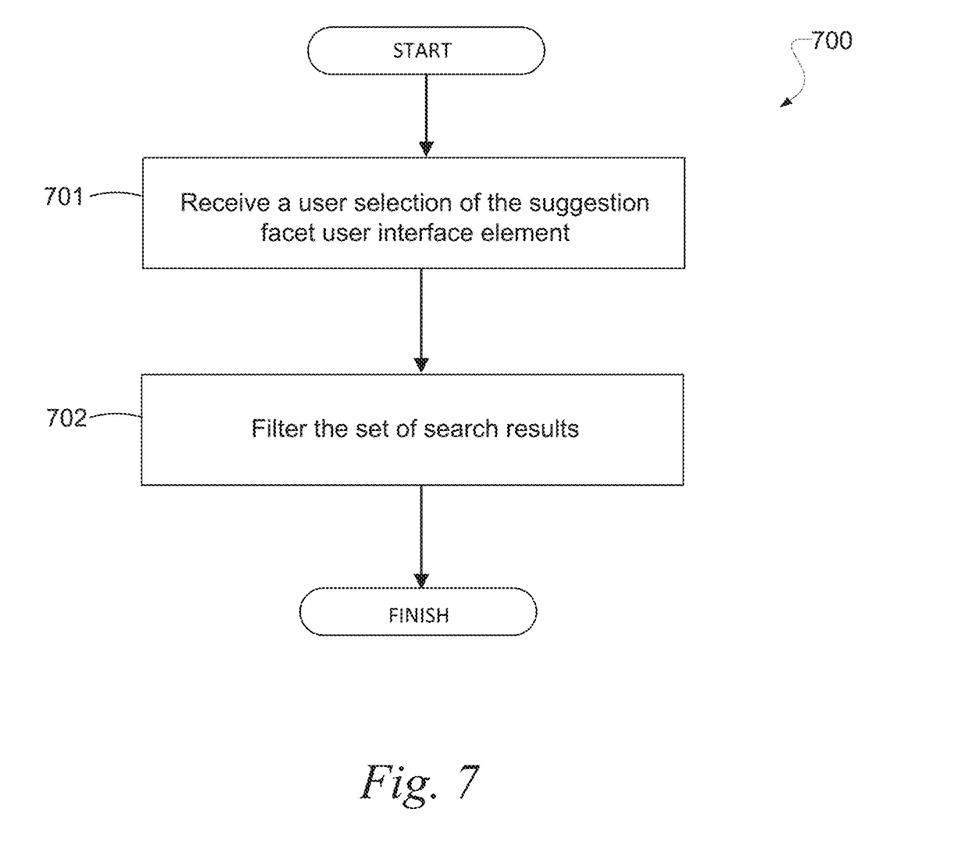
FIG. 7 is a flowchart illustrating an example method, according to various embodiments.

FIG. 7 is a flowchart illustrating an example method 700, consistent with various embodiments described herein. The method 700 may be performed at least in part by, for example, the guided search system 200 illustrated in FIG. 2 (or an apparatus having similar modules, such as one or more client machines or application servers). In operation 701, the suggestion facet module 204 receives a user selection of the suggestion facet user interface element (e.g., the suggestion facet user interface element displayed in operation 605 in FIG. 6). In operation 702, the suggestion facet module 204 filters the set of search results displayed with the suggestion facet user interface element (e.g., displayed in operation 605 in FIG. 6). For example, the suggestion facet module 204 may filter the set of search results based on the candidate facet-value pair that was selected for inclusion in the suggestion facet user interface element (e.g., in operation 604 in FIG. 6). It is contemplated that the operations of method 700 may incorporate any of the other features disclosed herein. Various operations in the method 700 may be omitted or rearranged, as necessary.

In some embodiments, each win rate indicates a number of clicks received by at least one previously displayed suggestion facet user interface element including the corresponding candidate facet-value pair, divided by the number of clicks received by the previously displayed suggestion facet user interface element and search results that were displayed below the previously displayed suggestion facet user interface element in a search results page.

In some embodiments, each win rate indicates a number of clicks received by at least one previously displayed suggestion facet user interface element including the corresponding candidate facet-value pair, divided by the number of clicks received by the previously displayed suggestion facet user interface element and a predetermined number of search results (1 search result) that were displayed immediately below the previously displayed suggestion facet user interface element.

In some embodiments, each win rate indicates a number of clicks received by at least one previously displayed suggestion facet user interface element including the corresponding candidate facet-value pair, divided by the number of clicks received by the previously displayed suggestion facet user interface element and a specific-sized portion of a search results page that was displayed immediately below the previously displayed suggestion facet user interface element. In some embodiments, the specific-sized portion corresponds to a display height of the previously displayed suggestion facet user interface element.

In some embodiments, the guided search system 200 may also adjust a search result set (e.g., see operation 601 in FIG. 6) based on the title of the search results. For example, many job searches include a job title in the query, such as "CEO jobs". For such types of queries, it is possible to retrieve all jobs that have those terms in the job headline, company, or the body. However, since there is a large quantity of executive assistant jobs that include the term CEO in the body of the job description (e.g., "executive assistant to CEO"), such job listings increase the search result set significantly. Thus, the guided search system 200 may reduce the search result set to only include search results where the search query terms match the title of the job. Since the set of candidates for the suggestions described above are a function of the retrieved search result set, changing the retrieved search result set leads to suggestions of a higher quality. For example, because the guided search system 200 only retrieves jobs that are closer to the searcher's query, the quality of downstream suggestions are improved overall because the facet counts are more reliable, and the facet-value suggestions retrieved are more reliable. This may help avoid the overrepresentations of jobs (e.g., associated with certain locations, companies, job functions, etc.) that are numerous in number, such as ingested unpaid job listings.

Example Mobile Device

Figure 8:
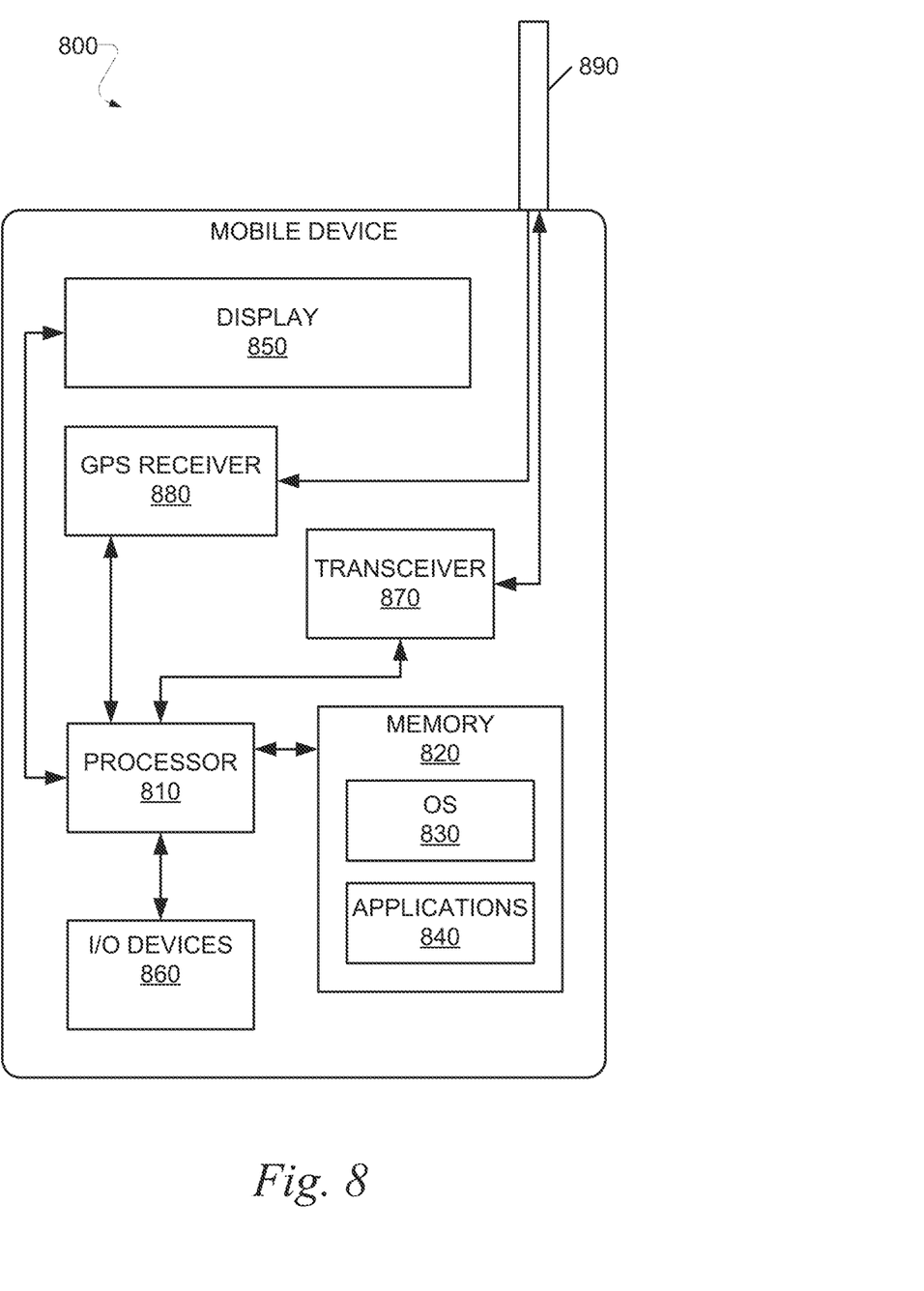
FIG. 8 illustrates an example mobile device, according to various embodiments.

FIG. 8 is a block diagram illustrating the mobile device 800, according to an example embodiment. The mobile device may correspond to, for example, one or more client machines or application servers. One or more of the modules of the system 200 illustrated in FIG. 2 may be implemented on or executed by the mobile device 800. The mobile device 800 may include a processor 810. The processor 810 may be any of a variety of different types of commercially available processors suitable for mobile devices (for example, an XScale architecture microprocessor, a Microprocessor without Interlocked Pipeline Stages (MIPS) architecture processor, or another type of processor). A memory 820, such as a Random Access Memory (RAM), a Flash memory, or other type of memory, is typically accessible to the processor 810. The memory 820 may be adapted to store an operating system (OS) 830, as well as application programs 840, such as a mobile location enabled application that may provide location based services to a user. The processor 810 may be coupled, either directly or via appropriate intermediary hardware, to a display 850 and to one or more input/output (I/O) devices 860, such as a keypad, a touch panel sensor, a microphone, and the like. Similarly, in some embodiments, the processor 810 may be coupled to a transceiver 870 that interfaces with an antenna 890. The transceiver 870 may be configured to both transmit and receive cellular network signals, wireless data signals, or other types of signals via the antenna 890, depending on the nature of the mobile device 800. Further, in some configurations, a GPS receiver 880 may also make use of the antenna 890 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
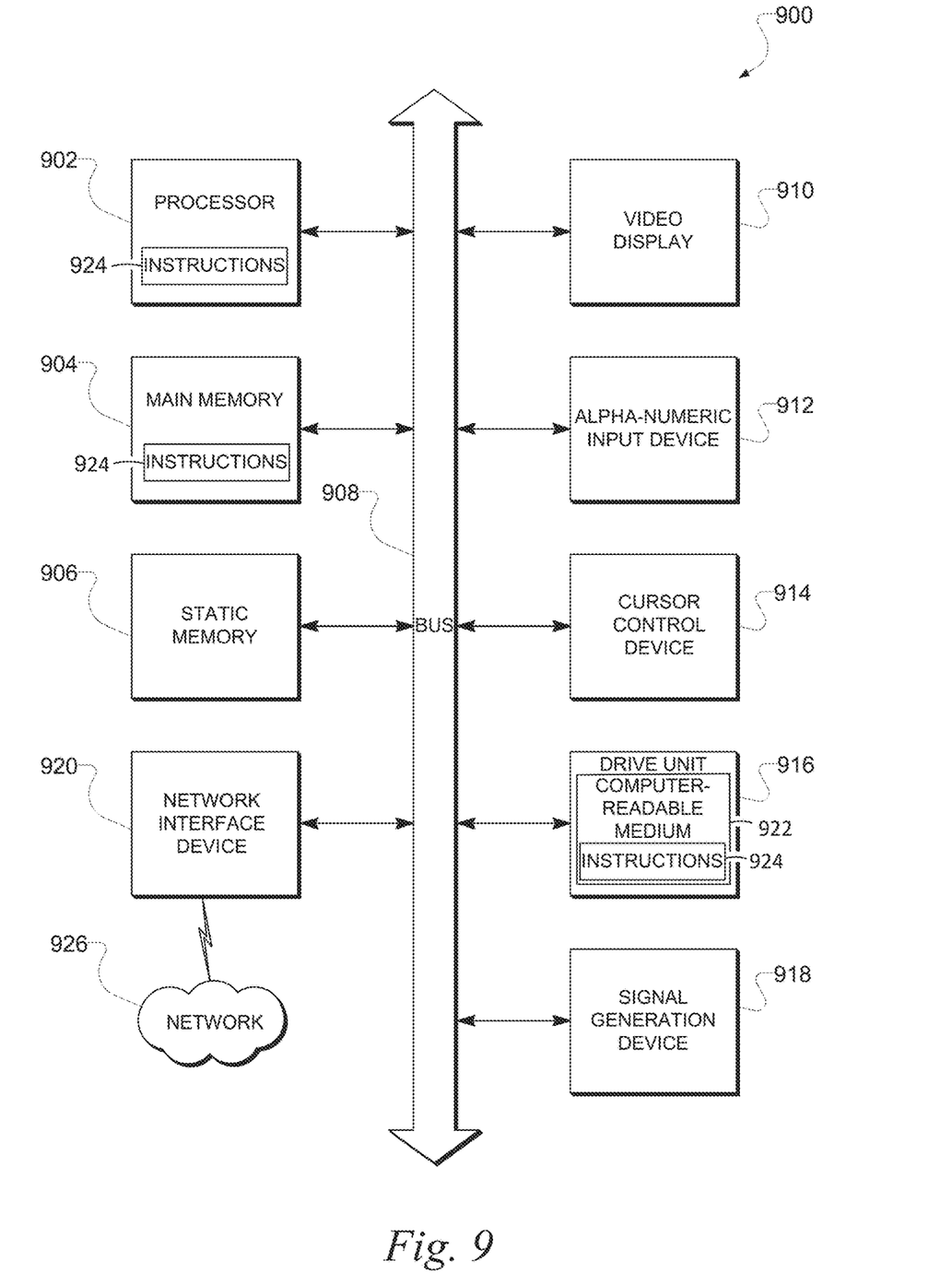
FIG. 9 is a diagrammatic representation of a machine in the example form of a computer system within which a set of instructions, for causing the machine to perform any one or more of the methodologies discussed herein, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT) The computer system 900 also includes an alphanumeric input device 912 (e.g., a keyboard or a touch-sensitive display screen), a user interface (UI) navigation device 914 (e.g., a mouse), a disk drive unit 916, a signal generation device 918 (e.g., a speaker) and a network interface device 920.

Machine-Readable Medium

The disk drive unit 9116 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   generating, in response to a user search query submitted by a user, a set of search results;
   accessing a list of candidate facet-value pairs for inclusion in a suggestion facet user interface element, the suggestion facet user interface element configured to filter the set of search results based on the corresponding facet-value pair;
   accessing win rate information indicative of user interaction with each of the candidate facet-value pairs, the win rate information for a candidate facet-value pair from the list of candidate facet-value pairs indicates how often the suggestion facet user interface element that includes the candidate facet-value pair was selected relative to selection of any search results displayed below the suggestion facet user interface element;
   selecting, using one or more processors, a specific one of the candidate facet-value pairs having the highest win rate;
   including the specific one of the candidate facet-value pairs having the highest win rate in the suggestion facet user interface element;
   before the set of search results is provided to the user, including, into a user interface, the suggestion facet user interface element as an item in a list, where the other items in the list each represent a search result from the set of search results; and
   causing the set of search results to be displayed via the user interface,
   wherein each win rate indicates a number of clicks received by at least one previously displayed suggestion facet user interface element including the corresponding candidate facet-value pair, divided by the number of clicks received by the previously displayed suggestion facet user interface element and search results that were displayed below the previously displayed suggestion facet user interface element in a search results page.

2. The method of claim 1, further comprising:
   receiving a user selection of the suggestion facet user interface element; and
   filtering the set of search results, based on the selected candidate facet-value pair.

3. The method of claim 1, wherein at least one of the facet-value pairs includes a facet corresponding to industry, location, or company.

4. The method of claim 1, wherein each win rate indicates a number of clicks received by at least one previously displayed suggestion facet user interface element including the corresponding candidate facet-value pair, divided by the number of clicks received by the previously displayed suggestion facet user interface element and a predetermined number of search results that were displayed immediately below the previously displayed suggestion facet user interface element.

5. The method of claim 1, wherein each win rate indicates a number of clicks received by at least one previously displayed suggestion facet user interface element including the corresponding candidate facet-value pair, divided by the number of clicks received by the previously displayed suggestion facet user interface element and a specific-sized portion of a search results page that was displayed immediately below the previously displayed suggestion facet user interface element.

6. The method of claim 5, wherein the specific-sized portion corresponds to a display height of the previously displayed suggestion facet user interface element.

7. A system comprising:
   one or more processors; and
   a non-transitory computer readable storage medium comprising instructions that when executed by the one or processors cause the one or more processors to perform operations comprising:
   generating, in response to a user search query submitted by a user, a set of search results;
   accessing a list of candidate facet-value pairs for inclusion in a suggestion facet user interface element, the suggestion facet user interface element configured to filter the set of search results based on the corresponding facet-value pair;
   accessing win rate information indicative of user interaction with each of the candidate facet-value pairs, the win rate information for a candidate facet-value pair from the list of candidate facet-value pairs indicates how often the suggestion facet user interface element that includes the candidate facet-value pair was selected relative to selection of any search results displayed below the suggestion facet user interface element;
   selecting a specific one of the candidate facet-value pairs having the highest win rate;
   including the specific one of the candidate facet-value pairs having the highest win rate in the suggestion facet user interface element;
   before the set of search results is provided to the user, including, into a user interface, the suggestion facet user interface element as an item in a list, where the other items in the list each represent a search result from the set of search results; and
   causing the set of search results to be displayed via the user interface, wherein each win rate indicates a number of clicks received by at least one previously displayed suggestion facet user interface element including the corresponding candidate facet-value pair, divided by the number of clicks received by the previously displayed suggestion facet user interface element and search results that were displayed below the previously displayed suggestion facet user interface element in a search results page.

8. The system of claim 7, further comprising:
receiving a user selection of the suggestion facet user interface element; and
filtering the set of search results, based on the selected candidate facet-value pair.

9. The system of claim 7, wherein at least one of the facet-value pairs includes a facet corresponding to industry, location, or company.

10. The system of claim 7, wherein each win rate indicates a number of clicks received by at least one previously displayed suggestion facet user interface element including the corresponding candidate facet-value pair, divided by the number of clicks received by the previously displayed suggestion facet user interface element and a predetermined number of search results that were displayed immediately below the previously displayed suggestion facet user interface element.

11. The system of claim 7, wherein each win rate indicates a number of clicks received by at least one previously displayed suggestion facet user interface element including the corresponding candidate facet-value pair, divided by the number of clicks received by the previously displayed suggestion facet user interface element and a specific-sized portion of a search results page that was displayed immediately below the previously displayed suggestion facet user interface element.

12. The system of claim 7, wherein the specific-sized portion corresponds to a display height of the previously displayed suggestion facet user interface element.

13. A non-transitory machine-readable storage medium comprising instructions that, when executed by one or more processors of a machine, cause the machine to perform operations comprising:
generating, in response to a user search query submitted by a user, a set of search results;
accessing a list of candidate facet-value pairs for inclusion in a suggestion facet user interface element, the suggestion facet user interface element configured to filter the set of search results based on the corresponding facet-value pair;
accessing win rate information indicative of user interaction with each of the candidate facet-value pairs, the win rate information for a candidate facet-value pair from the list of candidate facet-value pairs indicates how often the suggestion facet user interface element that includes the candidate facet-value pair was selected relative to selection of any search results displayed below the suggestion facet user interface element;
selecting a specific one of the candidate facet-value pairs having the highest win rate;
including the specific one of the candidate facet-value pairs having the highest win rate in the suggestion facet user interface element;
before the set of search results is provided to the user, including, into a user interface, the suggestion facet user interface element as an item in a list, where the other items in the list each represent a search result from the set of search results; and
causing the set of search results to be displayed via the user interface,
wherein each win rate indicates a number of clicks received by at least one previously displayed suggestion facet user interface element including the corresponding candidate facet-value pair, divided by the number of clicks received by the previously displayed suggestion facet user interface element and search results that were displayed below the previously displayed suggestion facet user interface element in a search results page.

14. The storage medium of claim 13, wherein the operations further comprise:
receiving a user selection of the suggestion facet user interface element; and
filtering the set of search results, based on the selected candidate facet-value pair.

15. The storage medium of claim 13, wherein at least one of the facet-value pairs includes a facet corresponding to industry, location, or company.

16. The storage medium of claim 13, wherein each win rate indicates a number of clicks received by at least one previously displayed suggestion facet user interface element including the corresponding candidate facet-value pair, divided by the number of clicks received by the previously displayed suggestion facet user interface element and a predetermined number of search results that were displayed immediately below the previously displayed suggestion facet user interface element.

17. The storage medium of claim 13, wherein each win rate indicates a number of clicks received by at least one previously displayed suggestion facet user interface element including the corresponding candidate facet-value pair, divided by the number of clicks received by the previously displayed suggestion facet user interface element and a specific-sized portion of a search results page that was displayed immediately below the previously displayed suggestion facet user interface element.

* * * * *